(12) United States Patent
Kashu et al.

(10) Patent No.: US 11,898,861 B2
(45) Date of Patent: Feb. 13, 2024

(54) ROAD ZONE ASSESSMENT DEVICE, MEDIUM STORING COMPUTER PROGRAM FOR ROAD ZONE ASSESSMENT, AND ROAD ZONE ASSESSMENT METHOD

(71) Applicants: TOYOTA JIDOSHA KABUSHIKI KAISHA, Toyota (JP); DENSO CORPORATION, Kariya (JP)

(72) Inventors: Takao Kashu, Tokyo-to (JP); Hiroaki Sakakibara, Tokyo-to (JP); Yasutaka Teramae, Kawasaki (JP); Hiroki Ukai, Kariya (JP); Masahiro Goto, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 17/703,456

(22) Filed: Mar. 24, 2022

(65) Prior Publication Data
US 2022/0316895 A1 Oct. 6, 2022

(30) Foreign Application Priority Data

Mar. 30, 2021 (JP) .................................. 2021-058497

(51) Int. Cl.
*G01C 21/34* (2006.01)
*G01C 21/36* (2006.01)

(52) U.S. Cl.
CPC ..... *G01C 21/3461* (2013.01); *G01C 21/3492* (2013.01); *G01C 21/3617* (2013.01); *G01C 21/3635* (2013.01)

(58) Field of Classification Search
CPC ............ G01C 21/3461; G01C 21/3492; G01C 21/3617; G01C 21/3635; G01C 21/30;
(Continued)

(56) References Cited

U.S. PATENT DOCUMENTS

| 9,880,019 B2* | 1/2018 | McCarthy ............... G06T 19/20 |
| 2010/0217512 A1* | 8/2010 | Vu ..................... G01C 21/3461 |
| | | 701/532 |

(Continued)

FOREIGN PATENT DOCUMENTS

| JP | 2017-083446 A | 5/2017 |
| JP | 2019-184498 A | 10/2019 |

(Continued)

*Primary Examiner* — Amelia Vorce
(74) *Attorney, Agent, or Firm* — Sughrue Mion, PLLC

(57) ABSTRACT

A road zone assessment device has a processor configured to select a first road zone from among multiple first road zones representing a first road associated with a vehicle navigation route, and connected with a second road zone representing a second road different from the first road, on a location-estimating map used for a vehicle, to determine whether or not the navigation route extends from the selected first road zone to the second road zone, to identify other first road zone associated with the navigation route from the selected first road zone forward on the destination location side of the navigation route, and to release association between the other first road zone and the navigation route when the selected first road zone is connected with the second road zone and the navigation route extends from the selected first road zone to the second road zone.

5 Claims, 11 Drawing Sheets

(58) Field of Classification Search
CPC .............. G01C 21/3819; G01C 21/32; G01C 21/3658; G01C 21/3815
See application file for complete search history.

(56) References Cited

U.S. PATENT DOCUMENTS

| | | | | |
|---|---|---|---|---|
| 2014/0309932 A1* | 10/2014 | Chen | ................ | G01C 21/3461 |
| | | | | 701/527 |
| 2017/0122754 A1 | 5/2017 | Konishi et al. | | |
| 2022/0026225 A1* | 1/2022 | Bennati | ............. | G01C 21/3617 |
| 2022/0316911 A1* | 10/2022 | Ukai | ................. | G01C 21/3461 |
| 2023/0195122 A1* | 6/2023 | Shenfeld | ........... | G01C 21/3841 |
| | | | | 701/26 |

FOREIGN PATENT DOCUMENTS

| | | |
|---|---|---|
| JP | 2019-184499 A | 10/2019 |
| JP | 2020-090196 A | 6/2020 |

* cited by examiner

| ROAD ZONE ID | CONNECTION SOURCE ID | CONNECTION TARGET ID | ROAD ZONE INFORMATION |
|---|---|---|---|
| | | | |
| | | | |
| | | | |
| | | | |

FIG. 10

| ROAD LINK | ROAD ZONE |
|---|---|
| T 1 | S 1 |
|  | S 2 |
|  | S 3 |
| ⋮ | ⋮ |
| T 3 | S 5 |
|  | S 6 |
| T 4 | S 7 |
|  | S 8 |
| T 5 | S 7 |
|  | S 8 |
| T 6 | S 11 |
| ⋮ | ⋮ |

ROAD ZONE ASSESSMENT DEVICE, MEDIUM STORING COMPUTER PROGRAM FOR ROAD ZONE ASSESSMENT, AND ROAD ZONE ASSESSMENT METHOD

FIELD

The present disclosure relates to a road zone assessment device, to a medium storing a computer program for road zone assessment, and to a road zone assessment method.

BACKGROUND

An automatic control device mounted in a vehicle creates a navigation route for the vehicle based on the current location of the vehicle, the destination location of the vehicle, and a navigation map. The automatic control device estimates the current location of the vehicle using a location-estimating map, and controls the vehicle to travel along the navigation route.

A navigation route on a navigation map is represented by multiple road links connected via nodes. A navigation route for automatic control of a vehicle in a location-estimating map is represented as a connected series of multiple road zones representing roads on the location-estimating map. The vehicle automatic control device associates the road links representing the navigation route with road zones representing the roads on the location-estimating map, thereby associating the navigation route with the road zones. The automatic control device uses the road zones associated with the navigation route to estimate the location of the vehicle and execute automatic control of vehicle driving.

Japanese Unexamined Patent Publication No. 2017-83446, for example, proposes a self-driving system having a navigation device that searches for a route (navigation route) from the current location of the vehicle to a destination location, and a high precision map unit that, based on the searched route and map information, divides the route into multiple block regions (road zones) and generates, in block region units, detailed information necessary for current automatic control among detailed information corresponding to the multiple block regions.

In the navigation map, road branches are represented as multiple road links connected from one node on the destination location side. When a branch exists on the navigation route, the navigation route is represented by selecting one road link from among the multiple road links connected from one node on the destination location side. Road branches on the location-estimating map, on the other hand, are represented as multiple road zones connected from one road zone on the destination location side. When a road branch exists on the navigation route, one road zone associated with the road link representing the navigation route is selected from among the multiple road zones connected from one road zone on the destination location side.

SUMMARY

However, the node locations on a navigation route in a navigation map and the locations connecting road zones in a location-estimating map are not necessarily always set to match. In addition, for association between the road links and road zones, road links and road zones have been associated on the navigation route until road zone branches have been counted in the same number as the multiple road links connected from one node on the navigation route on the destination location side. The road zones associated with the road links are also associated with the navigation route. Therefore, road zones associated with road links not representing the navigation route have sometimes been associated with the navigation route.

It is therefore an object of the present disclosure to provide a road zone assessment device that can avoid associating road zones that should not be associated with the navigation route, at branching locations of the navigation route.

One embodiment of the invention provides a road zone assessment device. The road zone assessment device comprises a selecting unit that selects a first road zone from among multiple first road zones representing a first road associated with a vehicle navigation route generated based on a navigation map, and connected with a second road zone representing a second road that is different from the first road, on a location-estimating map used for estimating the location of a vehicle, an assessment unit that determines whether or not the navigation route extends from the selected first road zone to the second road zone, an identifying unit that identifies other first road zone associated with the navigation route forward from the selected first road zone on the destination location side of the navigation route, and a releasing unit that releases association between the other first road zone and the navigation route when the selected first road zone is connected with the second road zone and the navigation route extends from the selected first road zone to the second road zone.

In this road zone assessment device, the identifying unit preferably identifies an end first road zone located furthest toward the destination location side of the navigation route from among the multiple first road zones representing the first road associated with the vehicle navigation route, and identifies the first road zone from the selected first road zone to the forward end first road zone, as the other first road zone.

Preferably in this road zone assessment device, the selecting unit selects the first road zone associated with the vehicle navigation route generated based on the navigation map, which is nearest to the current location of the vehicle from among the multiple first road zones representing the first road and is connected with the second road zone representing the second road that is different from the first road, on the location-estimating map.

According to another embodiment there is provided a computer program for road zone assessment. The computer program for road zone assessment causes a processor to execute a process, the process including selecting a first road zone from among multiple first road zones representing a first road associated with a vehicle navigation route generated based on a navigation map, and connected with a second road zone representing a second road that is different from the first road, on a location-estimating map used for estimating the location of a vehicle, determining whether or not the navigation route extends from the selected first road zone to the second road zone, identifying other first road zone associated with the navigation route from the selected first road zone forward on the destination location side of the navigation route, and releasing association between the other first road zone and the navigation route when the selected first road zone is connected with the second road zone and the navigation route extends from the selected first road zone to the second road zone.

Another embodiment of the invention provides a road zone assessment method. The road zone assessment method is carried out by a road zone assessment device and includes selecting a first road zone from among multiple first road zones representing a first road associated with a vehicle navigation route generated based on a navigation map, and connected with a second road zone representing a second road that is different from the first road, on a location-estimating map used for estimating the location of a vehicle, determining whether or not the navigation route extends from the selected first road zone to the second road zone, identifying other first road zone associated with the navigation route from the selected first road zone forward on the destination location side of the navigation route, and releasing association between the other first road zone and the navigation route when the selected first road zone is connected with the second road zone and the navigation route extends from the selected first road zone to the second road zone.

Since the road zone assessment device of this disclosure can release association with the navigation route for road zones that should not be associated with the navigation route, at branching locations of the navigation route, it can prevent self-driving control from being executed toward routes that are not navigation routes.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 10 is a diagram showing an association table (1).

DESCRIPTION OF EMBODIMENTS

Figure 1:
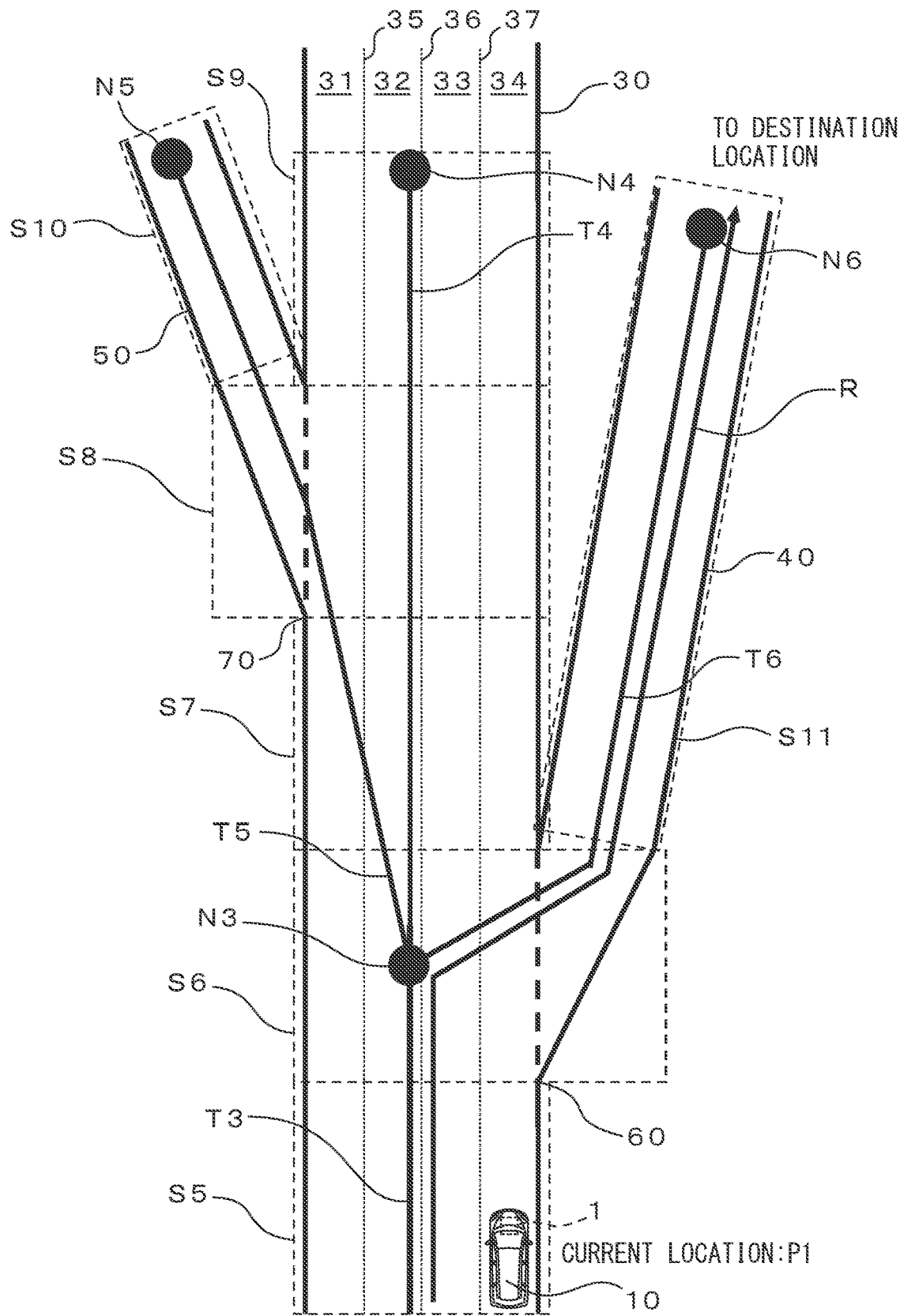
FIG. 1 is a diagram illustrating in overview the operation of a vehicle control system according to an embodiment.

FIG. 1 is a diagram illustrating in overview the operation of a vehicle control system 1 according to the embodiment. Operation relating to road zone assessment processing by the vehicle control system 1 disclosed herein will now be described in overview with reference to FIG. 1.

In the example shown in FIG. 1, a vehicle 10 travels on a traffic lane 34 of a road 30 having four traffic lanes 31 to 34. The traffic lane 31 and traffic lane 32 are marked with a lane marking line 35, the traffic lane 32 and traffic lane 33 are marked by a lane marking line 36, and the traffic lane 33 and traffic lane 34 are marked by a lane marking line 37.

The vehicle control system 1 mounted in the vehicle 10 automatically controls driving of the vehicle 10. The vehicle control system 1 generates a navigation route R for the vehicle 10, based on the current location P1 of the vehicle 10, the destination location of the vehicle 10, and a navigation map.

FIG. 1 shows a portion of a navigation route R generated by a vehicle control system 1. The vehicle 10 is traveling on a road 30 at the current location P1, and is expected to exit from a branching location 60 to a branching road 40.

In the navigation map, roads are represented as multiple road links connected by nodes. The navigation route R represents the multiple road links representing each road forming the route, as being connected via the nodes. In the navigation route R, branched roads are represented as one selected from among two or more road links extending from a single node.

In the example shown in FIG. 1, the navigation route R includes a branching location 60 where the road 40 branches from the road 30. Branching of the road 40 from the road 30 is represented by connection between a road link T3 representing the road 30 and a road link T6 representing the road 40, via a node N3. The road link T6 extending from the node N3 represents the navigation route R. The road link T6 is also connected with another road link representing a road 40 on the navigation route R, via a node N6.

In the example shown in FIG. 1, the road link T4 representing the road 30 extends from the node N3 to the destination location side. The road link T4 is connected with another road link representing the road 30 via a node N4. The road link T4 extending from the node N3 does not represent the navigation route R.

In the example shown in FIG. 1, a branching location 70 is included where the road 50 branches from the road 30. Branching of the road 50 from the road 30 is represented by connection between the road link T3 representing the road 30 and a road link T5 representing the road 50, via the node N3. The road link T5 extending from the node N3 does not represent the navigation route R. The road link T5 is connected with another road link representing the road 50 via a node N5.

The vehicle control system 1 estimates the current location of the vehicle 10 using the location-estimating map. The location-estimating map has high precision map information relating to the roads to be used for estimating the current location of the vehicle 10. The roads in the location-estimating map are represented as a series of multiple road zones.

In the example shown in FIG. 1, a portion of the road 30 is represented as the series of a road zone S5, a road zone S6, a road zone S7, a road zone S8 and a road zone S9. A portion of the road 40 branching from the road 30 at the branching location 60 is represented as a road zone S11. A portion of the road 50 branching from the road 30 at the branching location 70 is represented as a road zone S10.

The vehicle control system 1 associates multiple road links representing the navigation route R of the vehicle 10 generated on the navigation map, with multiple road zones representing roads in the location-estimating map, thereby associating the navigation route R with the location-estimating map. The vehicle control system 1 estimates the current location of the vehicle 10 using the location-estimating map, and controls the vehicle 10 to travel along the navigation route R.

When the navigation route R includes a branching location, the vehicle control system 1 associates the navigation route R with each of the road zones overlapping with road links extending from the branching location node, until it counts road zone branches in the same number as the multiple road links connected from the branching location node to the destination location side on the navigation route R.

In the example shown in FIG. 1, branching of the two roads 40 and 50 from the road 30 in the navigation map is represented in the navigation route R as three road links T4, T5, T6 connected from the one node N3 to the destination location side.

In the navigation route R, the location of the node N3 where the road link T6 representing the road 40 branches from the road link T3 representing the road 30 matches the connecting location between the road zone S6 representing the road 30 and the road zone S11 representing the road 40. However, the location of the node N3 where the road link T5 representing the road 50 branches from the road link T3 representing the road 30 does not match the connecting location between the road zone S8 representing the road 30 and the road zone S10 representing the road 50.

The vehicle control system 1 associates the navigation route R with each of the road zones S7, S8 overlapping with the road links T4, T5, T6 extending from the node N3, until it counts the road zone connections representing the two roads different from the road 30, which are connected from the node N3 on the destination location side of the navigation route R.

In the example shown in FIG. 1, the vehicle control system 1 counts a connection of the road zone S7 of the road 30 and the road zone S11 of the road 40 from the road zone S6 of the road 30 toward the destination location side, as one connection of the road zone S11 representing the road 40 different from the road 30, to the road 30. The vehicle control system 1 also counts a connection of the road zone S9 of the road 30 and the road zone S10 of the road 50 from the road zone S8 of the road 30 toward the destination location side, as one connection of the road zone S10 representing the road 50 different from the road 30, to the road 30.

Therefore, the vehicle control system 1 recognizes the road zone S7 and road zone S8, which overlap with the road link T4 and road link T5 that do not represent the navigation route R, as road zones associated with the navigation route R.

When the road zone S7 and road zone S8 representing the road 30 are associated with the navigation route R and the road zone S11 representing the road 40 is associated with the navigation route R, then two routes associated with the navigation route R exist forward from the road zone S6. The vehicle control system 1 selects the route with the longer distance forward from the road zone S6. If the destination location is included in the road zone S11, for example, the route that contains the road zone S7 and the road zone S8 forward from the road zone S6 may be longer than the route containing the road zone S11. It is then possible that the vehicle control system 1 may erroneously select the route to be the road zone S7 and road zone S8 representing the road 30. Therefore, the vehicle control system 1 releases the road zone that was erroneously associated with the navigation route R, in the manner described below.

In the example shown in FIG. 1, the vehicle control system 1 selects the road zone S6 representing the road 30, which is associated with the navigation route R and is connected to the road zone representing the road 40 that is different from the road 30 and is nearest to the current location P1 of the vehicle 10 from among the multiple road zones representing the road 30, in the location-estimating map used to estimate the location of the vehicle 10.

Since the navigation route R of the vehicle 10 extends from the selected road zone S6 toward the road zone 40, the vehicle control system 1 identifies other road zones S7, S8 of the road 30 associated with the navigation route R, on the destination location side of the navigation route R forward from the selected road zone S6.

Since the selected road zone S6 is connected with the road 40 and the navigation route R extends from the selected road zone S6 toward the road zone S11 of the road 40, the vehicle control system 1 releases association between the navigation route R and the other road zones S7, S8 of the road 30.

Since the vehicle control system 1 thus releases association with the navigation route R for road zones that should not be associated with the navigation route R, at the branching locations of the navigation route R, it can prevent self-driving control from being executed toward routes that are not on the navigation route R.

Figure 2:
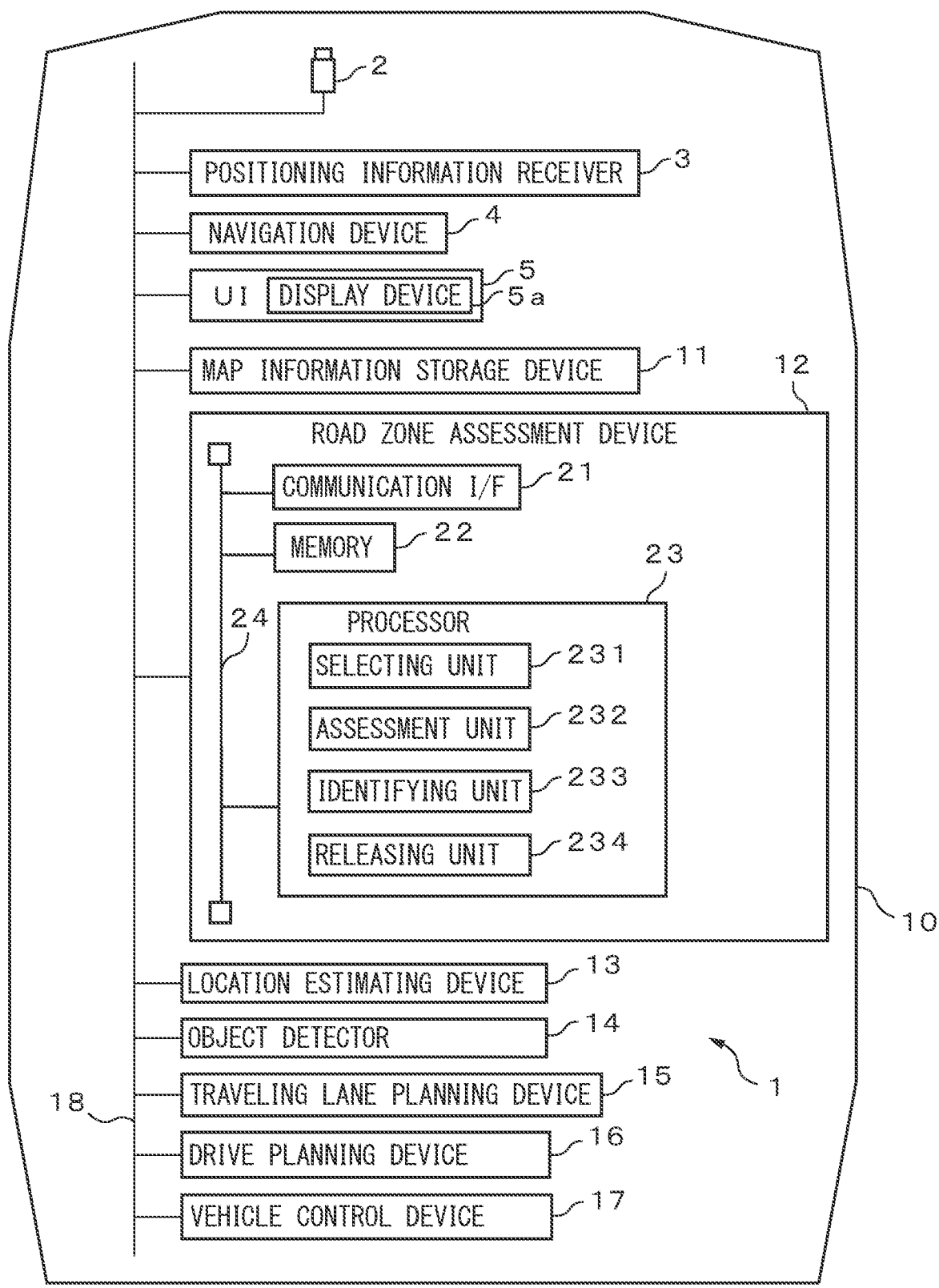
FIG. 2 is a general schematic drawing of a vehicle in which a vehicle control system of the embodiment is mounted.

FIG. 2 is a general schematic drawing of a vehicle 10 in which the vehicle control system 1 is mounted. The vehicle 10 has a camera 2, a positioning information receiver 3, a navigation device 4, a user interface (UI) 5, a map information storage device 11, a road zone assessment device 12, a location estimating device 13, an object detector 14, a traveling lane planning device 15, a drive planning device 16 and a vehicle control device 17. The vehicle 10 may also have a LiDAR sensor, as a distance sensor (not shown) for measurement of the distance of the vehicle 10 to surrounding objects.

The camera 2, positioning information receiver 3, navigation device 4, UI 5, map information storage device 11, road zone assessment device 12, location estimating device 13, object detector 14, traveling lane planning device 15, drive planning device 16 and vehicle control device 17 are connected in a communicable manner through an in-vehicle network 18 that conforms to controller area network standards.

The camera 2 is an example of an imaging unit provided in the vehicle 10. The camera 2 is mounted inside the vehicle 10 and directed toward the front of the vehicle 10. The camera 2, for example, takes a camera image in which the environment of a predetermined region ahead of the vehicle 10 is shown, at a predetermined cycle. The camera image can show the road in the predetermined region ahead of the vehicle 10, and road features such as surface lane marking lines on the road. The camera 2 has a 2D detector composed of an array of photoelectric conversion elements with visible light sensitivity, such as a CCD or C-MOS, and an imaging optical system that forms an image of the photographed region on the 2D detector.

Each time a camera image is taken, the camera 2 outputs the camera image and the camera image photograph time at which the camera image was taken, through the in-vehicle network 18 to the location estimating device 13 and object detector 14. The camera image is also used for processing at the location estimating device 13 to estimate the location of the vehicle 10. At the object detector 14, the camera image is used for processing to detect other objects surrounding the vehicle 10.

The positioning information receiver 3 outputs positioning information that represents the current location of the vehicle 10. The positioning information receiver 3 may be a GNSS receiver, for example. The positioning information receiver 3 outputs positioning information and the positioning information acquisition time at which the positioning information has been acquired, to the navigation device 4 and map information storage device 11 etc., each time positioning information is acquired at a predetermined receiving cycle.

Based on the navigation map information, the destination location of the vehicle 10 input through the UI 5, and positioning information representing the current location of the vehicle 10 input from the positioning information receiver 3, the navigation device 4 creates a navigation route R from the current location to the destination location of the vehicle 10. The navigation route R includes information relating to the locations of right turns, left turns, merging and branching. In the navigation map, roads are represented as multiple road links connected by nodes. Each of the nodes and road links is identified using identification information. The locations of the road links and nodes are represented on a world coordinate system where the origin is a predetermined location, for example. When the destination location has been newly set or the current location of the vehicle 10 has exited the navigation route R, the navigation device 4 creates a new navigation route R for the vehicle 10. Every time a navigation route R is created, the navigation device 4 outputs the navigation route R to the road zone assessment device 12 and the location estimating device 13 etc., via the in-vehicle network 18.

The UI 5 is an example of the notifying unit. The UI 5 is controlled by the navigation device 4 and vehicle control device 17, and notifies the driver of traveling information for the vehicle 10, and information indicating the last road zone in which automatic control is possible. The UI 5 also creates an operation signal in response to operation of the vehicle 10 by the driver. The traveling information of the vehicle 10 includes information relating to the current location of the vehicle and the current and future route of the vehicle, such as the navigation route. The UI 5 has a display device 5*a* such as a liquid crystal display or touch panel, for display of the traveling information. The UI 5 may also have an acoustic output device (not shown) to notify the driver of traveling information. The UI 5 also has a touch panel or operating button, for example, as an input device for inputting operation information from the driver to the vehicle 10. The operation information may be, for example, a destination location, transit points, vehicle speed or other control information for vehicles 10. The UI 5 outputs the input operation information to the navigation device 4 and the vehicle control device 17 etc., via the in-vehicle network 18.

The map information storage device 11 stores a wide-area location-estimating map for a relatively wide area (an area of 10 to 30 km$^2$, for example) that includes the current location of the vehicle 10. The location-estimating map preferably has high precision map information including three-dimensional information for the road surface, information for the types and locations of structures and road features such as road lane marking lines, and the legal speed limit for the road. The roads are represented as a series of multiple road zones. In a terrain where multiple roads are connected, such as road branching locations, merging locations and intersections, preferably the road zones are represented with the branching locations, merging locations or intersections included in a single road zone. Each of the road zones is identified using identification information. The map information storage device 11 has a road zone management table where information for road zones in the location-estimating map are registered. One or more traffic lanes in a road are associated with each one of the road zones. The locations of traffic lanes and road zones in the location-estimating map are represented on a world coordinate system where the origin is a predetermined location, for example. One lane of a road may also be represented as a series of multiple road zones. In this case, each of the multiple lanes in a single zone of the road is represented by a different road zone.

Figures 3, 4:
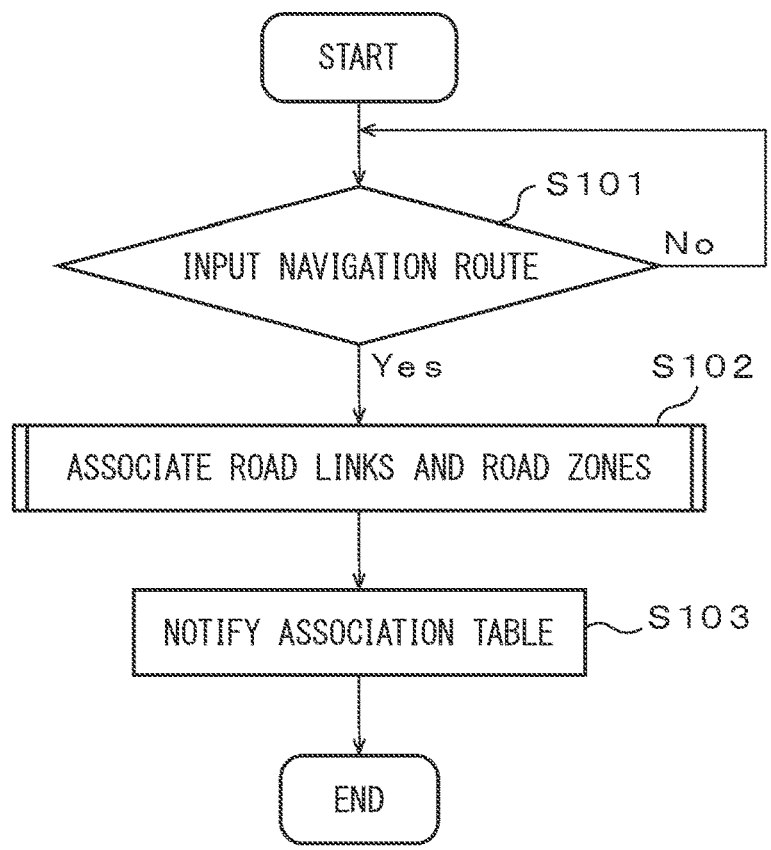
FIG. 3 is a diagram illustrating a road zone management table.
FIG. 4 is an operation flow chart (1) for association processing by a vehicle control system of the embodiment.

FIG. 3 is a diagram illustrating a road zone management table. Multiple road zones in the location-estimating map are registered in the road zone management table 80. The road zone management table 80 has a road zone ID column 81, a connection source ID column 82, a connection target ID column 82 and a road zone information column 84. Identification information for the road zones is registered in the road zone ID column 81. Road zone identification information for the road zone connection sources are registered in the connection source ID column 82. Road zone identification information for the road zone connection targets are registered in the connection target ID column 82. Information such as identification information for road including the road zone, and road zone location and lane information, is registered in the road zone information column 84.

The map information storage device 11 receives the wide-area map information from an external server via a base station, by wireless communication through a wireless communication device (not shown) mounted in the vehicle 10, in relation to the current location of the vehicle 10, and stores it in the storage device. The map information storage device 11 is an example of an associating unit, and it associates each of the multiple road links representing the navigation route R with corresponding road zones in the location-estimating map, every time a navigation route R is input. Association processing is described in detail below.

Each time positioning information is input from the positioning information receiver 3, the map information storage device 11 refers to the stored wide-area location-estimating map and outputs a location-estimating map for a relatively narrow area including the current location represented by the positioning information (for example, an area of 100 m to 10 km$^2$), through the in-vehicle network 18 to the road zone assessment device 12, location estimating device 13, object detector 14, traveling lane planning device 15, drive planning device 16 and vehicle control device 17 etc.

Using the location-estimating map to be used for estimating the location of a vehicle, the road zone assessment device 12 carries out selection processing in which a first road zone that connects with a second road zone representing a second road that is different from a first road, is selected from among multiple first road zones representing the first road which have been associated with the navigation route R of the vehicle 10 generated based on the navigation map. The road zone assessment device 12 also carries out assessment processing in which it determines whether or not the navigation route of the vehicle generated based on the navigation map extends from the selected first road zone to the second road zone. The road zone assessment device 12 further carries out identification processing in which it identifies other first road zone associated with the navigation route, forward from the selected first road zone toward the destination location side of the navigation route. The road zone assessment device 12 still further carries out release processing in which it releases association between the other first road zone and the navigation route, when the selected first road zone is connected with the second road zone and the navigation route extends from the selected first road zone to the second road zone. For this purpose, the road zone assessment device 12 has a communication interface (IF) 21, a memory 22 and a processor 23. The communication interface 21, memory 22 and processor 23 are connected via signal wires 24. The communication interface 21 has an interface circuit to connect each road zone assessment device 12 with the in-vehicle network 18.

All or some of the functions of the road zone assessment device 12 are functional modules driven by a computer program operating on the processor 23, for example. The processor 23 has a selecting unit 231, an assessment unit 232, an identifying unit 233 and a releasing unit 234. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit. The memory 22 is an example of a memory unit, and it has a volatile semiconductor memory and a non-volatile semiconductor memory, for example. The memory 22 stores an application computer program and various data to be used for information processing carried out by the processor 23 of each device. Operation of the road zone assessment device 12 will be described in detail below.

The location estimating device 13 estimates the location of the vehicle 10 at the camera image photograph time, based on the road features surrounding the vehicle 10 represented in the camera image. For example, the location estimating device 13 compares lane marking lines identified in the camera image with lane marking lines represented in the location-estimating map input from the map information storage device 11, and determines the estimated location and estimated declination of the vehicle 10 at the camera image photograph time. The location estimating device 13 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 13 outputs this information to the object detector 14, traveling lane planning device 15, drive planning device 16 and vehicle control device 17 etc.

The object detector 14 detects other objects around the vehicle 10 and their types (for example, vehicles) based on the camera image and reflected wave information. Other objects also include other vehicles traveling around the vehicle 10. The object detector 14 tracks other detected objects and determines the trajectories of the other objects. In addition, the object detector 14 identifies the traveling lanes in which the other objects are traveling, based on the lane marking lines represented in the map information and the locations of the objects. The object detector 14 outputs object detection information which includes information representing the types of other objects that were detected, information indicating their locations, and also information indicating their traveling lanes, to the traveling lane planning device 15 and drive planning device 16 etc.

At a traveling lane-planning creation time set in a predetermined cycle, the traveling lane planning device 15 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. For example, the traveling lane planning device 15 creates a traveling lane plan for the vehicle 10 to travel on a traffic lane other than a passing lane. Each time a traveling lane plan is created, the traveling lane planning device 15 outputs the drive planning device 16 of the traveling lane plan.

The traveling lane planning device 15 also determines whether or not a lane change is necessary within the nearest driving zone selected from the navigation route R, based on the map information, the navigation route R and the current location of the vehicle 10. The traveling lane planning device 15 may further utilize surrounding environment information or vehicle status information to determine whether or not a lane change is necessary. The surrounding environment information includes the locations and speeds of other vehicles traveling around the vehicle 10. The vehicle status information includes the current location of the vehicle 10, and the vehicle speed, acceleration and traveling direction. Specifically, the traveling lane planning device 15 determines whether or not a lane change is necessary for moving to a traffic lane toward the destination location of the vehicle 10, based on the navigation route R and the current location of the vehicle 10. It is determined whether or not the vehicle 10 is approaching another road that merges ahead from the traveling road on which it is currently traveling (merge), or the vehicle 10 is exiting onto another road branching out ahead from the traveling road (branch). Since merging and branching involve movement of the vehicle from a lane of the traveling road to a lane in another road, a lane change is carried out.

At a driving plan creation time set with a predetermined cycle, the drive planning device 16 carries out driving plan processing in which it creates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. When the traveling lane plan includes a lane change wherein the vehicle 10 is to move between traffic lanes, the drive planning device 16 creates a driving plan that includes the lane change, in such a manner that a spacing of at least a predetermined distance can be maintained between the vehicle 10 and other vehicles. When the traveling lane plan includes a lane change wherein the vehicle 10 is to move between lanes, but a spacing of at least a predetermined distance cannot be ensured between the vehicle 10 and another vehicle, the drive planning device 16 generates a driving plan for stopping the vehicle 10. The drive planning device 16 outputs the driving plan to the vehicle control device 17 for each driving plan generated.

The vehicle control device 17 controls each unit of the vehicle 10 based on the current location of the vehicle 10 and the vehicle speed and yaw rate, as well as on the driving plan generated by the drive planning device 16, so that the vehicle 10 travels along the navigation route R. For example, the vehicle control device 17 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 17 also outputs a control signal corresponding to a set steering amount, to an actuator (not shown) that controls the steering wheel for the vehicle 10, via the in-vehicle network 18. The vehicle control device 17 also determines the amount of fuel injection according to a set accelerator level, and outputs a control signal corresponding to the amount of fuel injection to a drive unit (not shown) of the engine of the vehicle 10, via the in-vehicle network 18. Alternatively, the vehicle control device 17 may output a control signal corresponding to a set brake level to the brake (not shown) of the vehicle 10, via the in-vehicle network 18.

For FIG. 2, the map information storage device 11, road zone assessment device 12, location estimating device 13, object detector 14, traveling lane planning device 15, drive planning device 16 and vehicle control device 17, were explained as separate devices, but all or some of them may be constructed in a single device.

FIG. 4 shows an example of an operation flow chart relating to association processing by the map information storage device 11 in the vehicle control system 1. Association processing by the map information storage device 11 will now be explained with reference to FIG. 4. The map information storage device 11 carries out association processing according to the operation flow chart shown in FIG. 4, each time a new navigation route is generated.

First, the map information storage device 11 of the vehicle control system 1 determines whether or not a new navigation route R has been input from the navigation device 4 (step S101).

Figure 5:
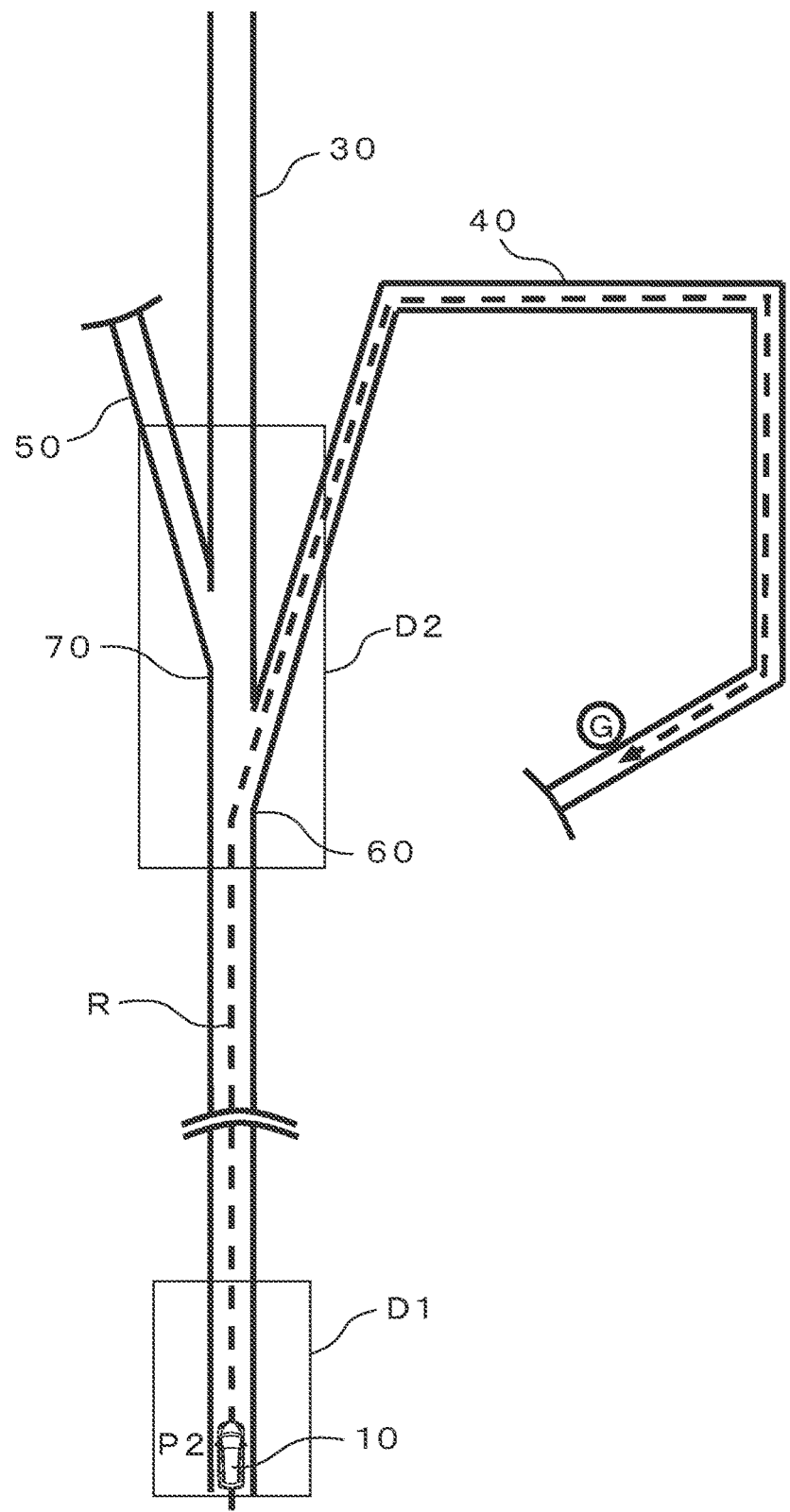
FIG. 5 is a diagram showing an example of a navigation route.

FIG. 5 shows an example of a navigation route R input from the navigation device 4. When a destination location has been newly set, or when the current location of the vehicle 10 has deviated from the navigation route, the navigation device 4 refers to the navigation map and generates a navigation route R, based on the current location P2 of the vehicle 10 and the destination location G. The example shown in FIG. 5, the navigation route R represents a scenario in which the vehicle 10 travels on the road 30 and then exits to the road 40 at the branching location 60, and travels on the road 40 to reach the destination location G.

When a navigation route R has been input (step S101—Yes), the map information storage device 11 associates corresponding road zones in the location-estimating map for each of the multiple road links representing the navigation route R from the current location P2 of the vehicle 10 to the destination location G (step S102). The map information storage device 11 also generates an association table representing association between the road zones and the road links representing the navigation route R from the current location P2 of the vehicle 10 to the destination location G. Processing in step S102 will now be explained with reference to FIG. 6 and FIG. 7. When a new navigation route R has not been input (step S101—No), processing returns to the start of step S101.

The map information storage device 11 next notifies the location-estimating map, as well as the road zone assessment device 12, location estimating device 13, object detector 14, traveling lane planning device 15 and drive planning device 16, of the association table generated in step S102 (Step S103) and the series of the processes is completed.

Figure 6:
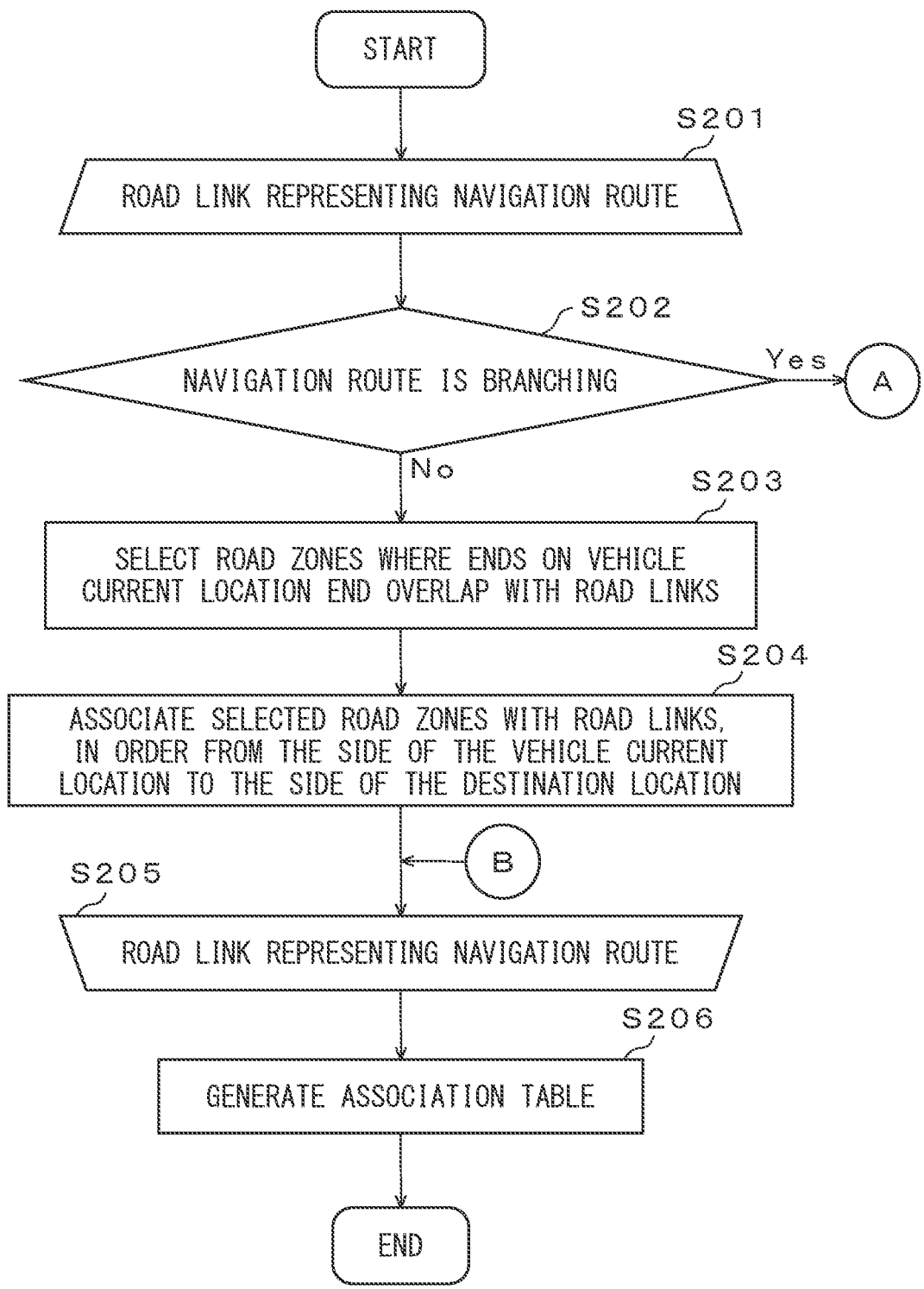
FIG. 6 is an operation flow chart (2) for association processing by a vehicle control system of the embodiment.
Figure 7:
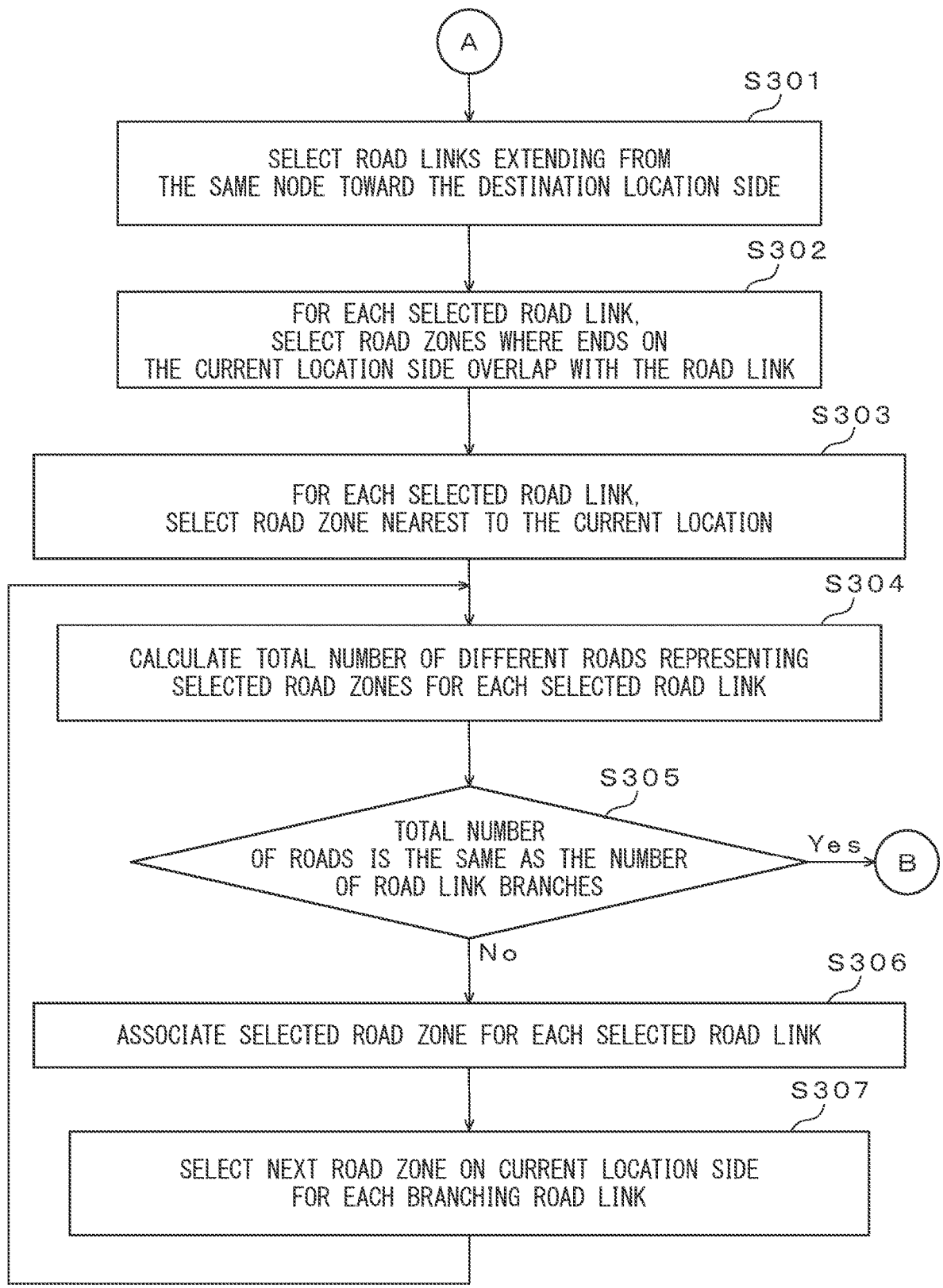
FIG. 7 is an operation flow chart (3) for association processing by a vehicle control system of the embodiment.

FIG. 6 and FIG. 7 are operation flow charts for processing by the map information storage device 11 in which road zones are associated for each of the road links representing the navigation route R in step S102.

In the example shown in FIG. 5, the map information storage device 11 carries out processing between step S201 and step S205 for each of the multiple road links representing the navigation route R from the current location P2 of the vehicle 10 to the destination location G.

First, the map information storage device 11 refers to the navigation route R, selects the first road link containing the current location P2 of the vehicle 10 and determines whether or not the navigation route R branches (step S202). Specifically, the map information storage device 11 determines whether or not the selected road link is one among multiple road links extending from the same node toward the destination location side. If the selected road link is one among multiple road links extending from the same node to the destination location side, then it determines that the navigation route R is branched (step S202—Yes), or otherwise it determines that the navigation route R is not branched (step S202—No).

Figure 8:
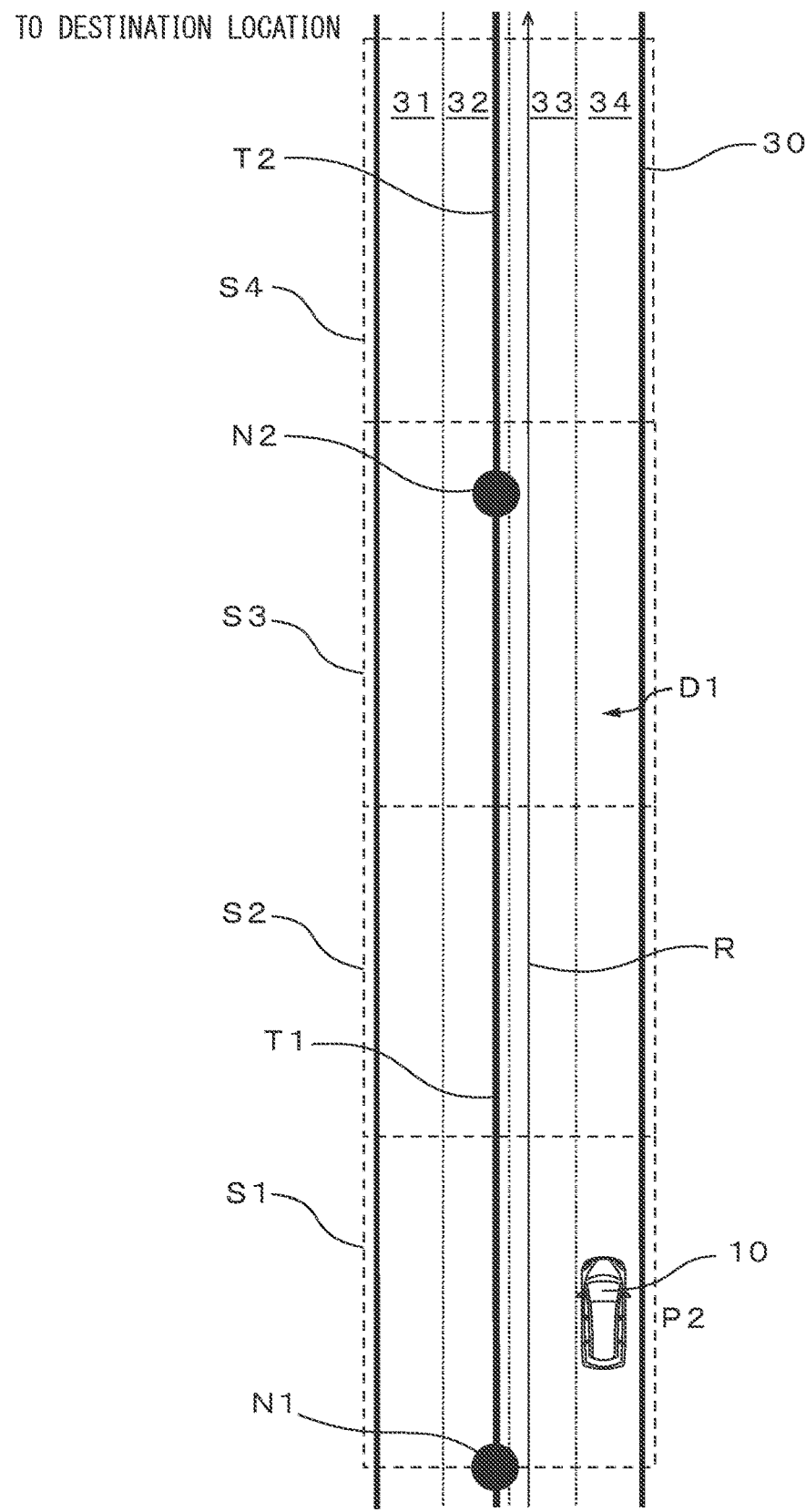
FIG. 8 is a diagram illustrating association processing by a vehicle control system (1).

FIG. 8 is a diagram illustrating processing by which the map information storage device 11 associates road links and road zones in zone D1 of the navigation route R (see FIG. 5). Similar to the example shown in FIG. 1, the vehicle 10 travels on the traffic lane 34 of the road 30 which has four traffic lanes 31 to 34. The zone D1 of the navigation route R is represented by a road link T1 representing the road 30, a road link T2 representing the road 30, and a node N2. The road link T1 extends from the node N1, and the road link T1 and road link T2 are connected via the node N2. In step S202, the road link T1 containing the current location P2 of the vehicle 10 is selected first. Since the road link T1 is not one among multiple nodes extending from the node N1 toward the destination location side, it is determined that the navigation route R is not branched.

When the navigation route R is not branched, the map information storage device 11 selects one or multiple road zones where the ends on the side of the current location of the vehicle 10 overlap with the area from the current location P2 of the vehicle 10 to the end point of the selected road link (step S203). The length of one road link will generally be longer than that of one road zone. The map information storage device 11 selects the road zone S1, the road zone S2 and the road zone S3 as road zones where the ends on the side of the current location of the vehicle 10 overlap with the area from the current location P2 of the vehicle 10 up to the end point of the road link T1.

Next, the map information storage device 11 associates each of the selected road zones S1, S2 and S3 with the road link T1 in order from the side of the current location of the vehicle 10 to the destination location side (step S204). In the example shown in FIG. 8, the road zone S1, the road zone S2 and the road zone S3 are associated in that order with the road link T1.

For the remaining road links representing the navigation route R, the map information storage device 11 repeats the processing between step S201 and step S205 and associates the road zones for each of the road links representing the navigation route R. In the example shown in FIG. 8, road zone S4 is further associated with the road link T2 in the zone D1 of the navigation route R.

Figure 9:
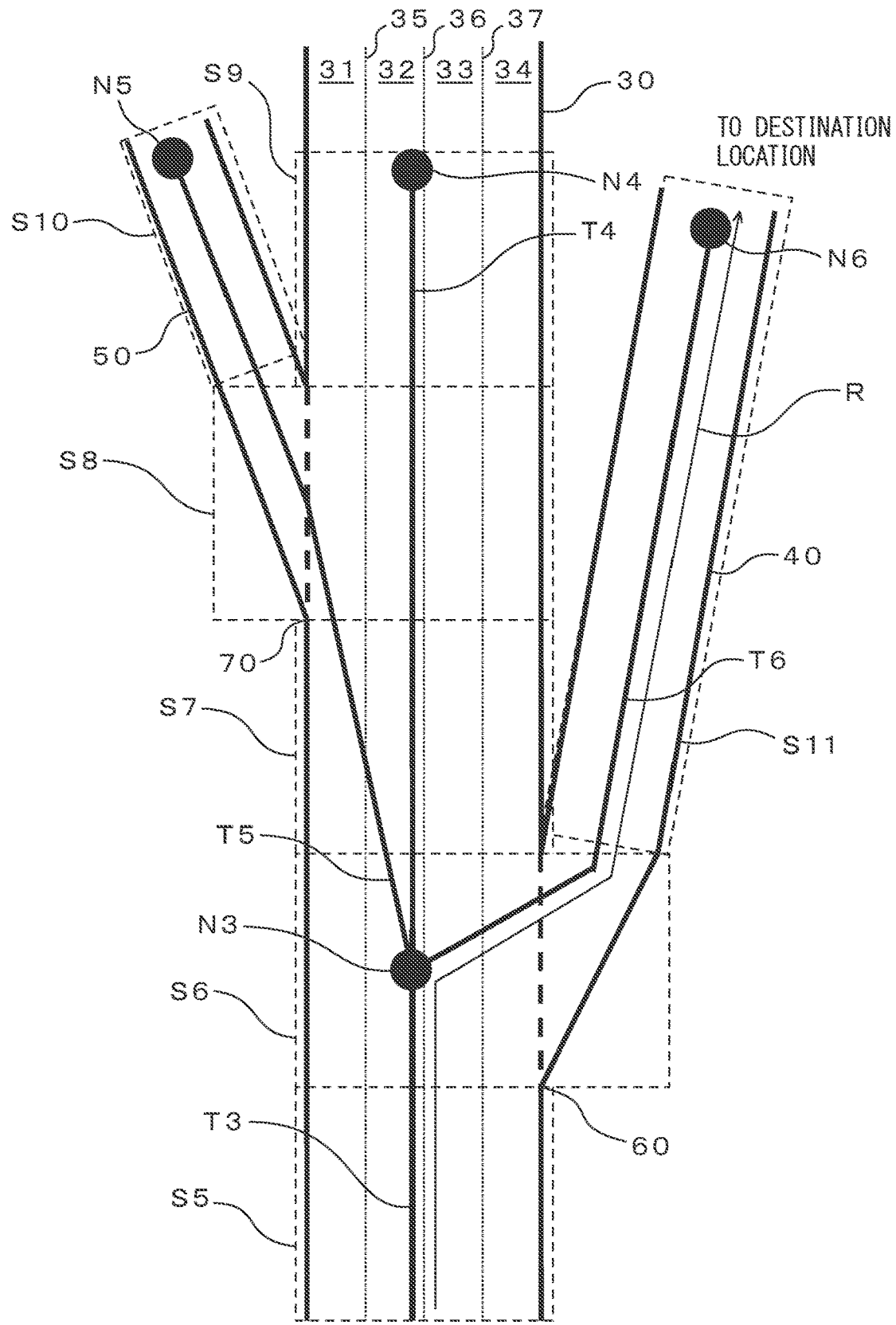
FIG. 9 is a diagram illustrating association processing by a vehicle control system (2).

FIG. 9 is a diagram illustrating processing by which the map information storage device 11 associates road links and road zones in zone D2 of the navigation route R (see FIG. 5). FIG. 9 corresponds to FIG. 1. The zone D2 of the navigation route R is represented by a road link T3 representing the road 30, a road link T6 representing the road 40, and a node N3. The road link T3 representing the road 30 and the road link T6 representing the road 40 represent the navigation route R. The road link T3 representing the road 30 is connected with the road link T4 representing the road 30 and the road link T5 representing the road 50, via the node N3. The road link T4 representing the road 30 and the road link T5 representing the road 50 are not road links representing the navigation route R.

For the road link T3 of the navigation route R representing the road 30, the map information storage device 11 first determines that the navigation route R is not branched (step S202—No), and associates the road zones S5, S6 representing the road 30 (steps S203 and S204).

Next, the map information storage device 11 determines whether or not the navigation route R is branching for the road link T6 representing the navigation route R (step S202). Since the road link T6 is one of the three road links T4, T5, T6 extending from the node N3 toward the destination location side, it is determined that the navigation route R is branched (step S202—Yes). The map information storage device 11 obtains a number "3" as the number of road link branches, based on the number of road links extending from the node N3 toward the destination location side.

The map information storage device 11 selects three road links T4, T5, T6 branching from the same node N3 toward the destination location side (step S301).

For each of the selected road links T4, T5, T6, the map information storage device 11 selects one or multiple road zones where the ends overlap on the side of the current location of the vehicle 10 (step S302). In the example shown in FIG. 9, the road zone S7, S8, S9 representing the road 30 are selected for the road link T4. For the road link T5, the road zones S7, S8 representing the road 30 and the road zone S10 representing the road 50 are selected. For the road link T6, the road zone S11 representing the road 40 is selected.

Next, the map information storage device 11 selects the road zone closest to the current location of the vehicle 10 for each of the selected road links T4, T5, T6 (step S303). In the example shown in FIG. 9, the road zone S7 representing the road 30 is selected for the road link T4, the road zone S7 representing the road 30 is selected for the road link T5, and the road zone S11 representing the road 40 is selected for the road link T6.

The map information storage device 11 calculates the total number of different roads representing the selected road zones for each of the road links T4, T5, T6 selected so far (step S304). In the example shown in FIG. 9, road zone S7 represents the road 30 and road zone S11 represents the road 40, and therefore a number "2" is obtained as the total number of different roads.

Next, the map information storage device 11 determines whether or not the total number of roads (2) is the same as the number of road link branches (3) (step S305). In the example shown in FIG. 9, the total number of roads (2) is not the same as the number of road link branches (3) (step S305—No), and therefore the selected road zone is associated for each of the selected road links T4, T5, T6 (step S306). Specifically, the road zone S7 representing the road 30 is associated for the road link T4, the road zone S7 representing the road 30 is associated for the road link T5, and the road zone S11 representing the road 40 is associated for the road link T6.

Next, the map information storage device 11 selects the next road zone on the side of the current location of the vehicle 10 for each of the selected road links T4, T5, T6 (step S307). In the example shown in FIG. 9, the road zone S8 representing the road 30 is selected for the road link T4, and the road zone S8 representing the road 30 is selected for the road link T5. Since there is no overlapping road zone for the road link T6, a new road zone is not selected.

The map information storage device 11 then calculates the total number of different roads representing the selected road zones for each of the selected road links T4, T5, T6 selected so far (step S304). In the example shown in FIG. 9, the road zone S7 represents the road 30, the road zone S8 represents the road 30 and the road zone S11 represents the road 40, and therefore a number "2" is obtained as the total number of different roads.

Next, the map information storage device 11 determines whether or not the total number of roads (2) is the same as the number of road link branches (3) (step S305). In the example shown in FIG. 9, the total number of roads (2) is not the same as the number of road link branches (3) (step S305—No), and therefore the selected road zone is associated for each of the selected road links T4, T5, T6 (step S306). The road zone S8 representing the road 30 is associated for the road link T4, and the road zone S8 representing the road 30 is associated for the road link T5.

Next, the map information storage device 11 selects the next road zone on the side of the current location of the vehicle 10 for each of the selected road links T4, T5, T6 (step S307). In the example shown in FIG. 9, the road zone S9 representing the road 30 is selected for the road link T4, and the road zone S10 representing the road 50 is selected for the road link T5. Since there is no overlapping road zone for the road link T6, a new road zone is not selected.

The map information storage device 11 then calculates the total number of different roads representing the selected road zones for each of the selected road links T4, T5, T6 selected so far (step S304). In the example shown in FIG. 9, the road zone S7 represents the road 30, the road zone S8 represents the road 30, the road zone S9 represents the road 30 and the road zone S10 represents the road 50 and the road zone S11 represents the road 40, and therefore a number "3" is obtained as the total number of different roads.

Next, the map information storage device 11 determines whether or not the total number of roads (3) is the same as the number of road link branches (3) (step S305). In the example shown in FIG. 9, the total number of roads (3) is the same as the number of road link branches (3) (step S305—Yes), and therefore processing proceeds to the start of step S205, without associating a selected road zone for each of the selected road links T4, T5, T6.

For the remaining road links representing the navigation route R up to the destination location, the map information storage device 11 repeats the processing between step S201 and step S205 and associates the road zones for each of the road links representing the navigation route R.

When the map information storage device 11 executes the processing of step S202 and step S203 for the final road link on the destination location G side of the navigation route R, it generates an association table representing association between the road zones and the road links representing the navigation route R from the current location P2 of the vehicle 10 to the destination location G (step S206) and the series of the processes is completed. An association table is newly generated each time a navigation route R is generated.

FIG. 10 is a diagram showing an example of an association table. The association table 100 has a road link column 101 in which the road links are registered, and a road zone column 102 in which the road zones associated with the road links are registered. In the association table 100, the road zone S1, the road zone S2 and the road zone S3 are associated in that order with the road link T1 representing the navigation route R. The road zone S5 and road zone S6 are also associated in that order with the road link T3 representing the navigation route R in the association table 100. In the association table 100, the road zone S7 and road zone S8 are also associated in that order with the road link T4 which does not represent the navigation route R. In the association table 100, the road zone S7 and road zone S8 are also associated in that order with the road link T5 which does not represent the navigation route R. Also in the association table 100, the road zone S11 is associated with the road link T6 which represents the navigation route R. The road zones registered in the association table 100 are considered to be associated with the navigation route R. In the road zone column 101, the current location P2 of the vehicle 10, at the point when the navigation route R was generated, is included in the initially registered road zone T1. The road zone finally registered in the road zone column 101 represents the final road zone associated with the navigation route R. This concludes explanation of association processing.

The road zone S7 and road zone S8 associated with the road link T4 and road link T5 which do not represent the navigation route R are road zones that originally are not to be associated with the navigation route R. Therefore, the vehicle control system 1 releases association of the road zone S7 and road zone S8 with the navigation route R, in the manner described below.

Figure 11:
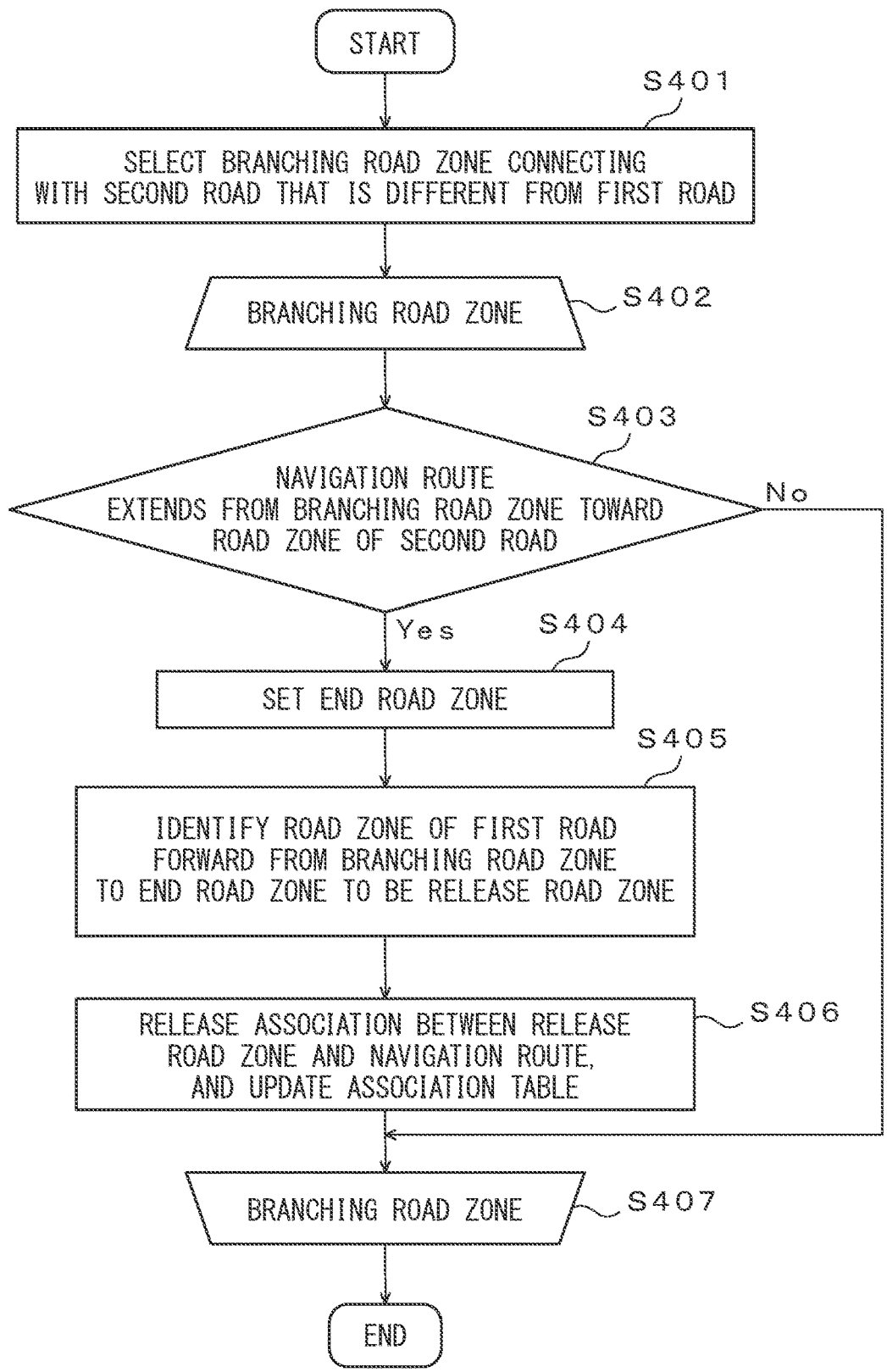
FIG. 11 is an operation flow chart for road zone assessment processing by a vehicle control system of the embodiment.

FIG. 11 is an operation flow chart for road zone assessment processing by the road zone assessment device 12 in the vehicle control system 1 of the embodiment. After association processing by the map information storage device 11 has been completed, the road zone assessment device 12 carries out road zone assessment processing according to the operation flow chart shown in FIG. 11.

First, the selecting unit 231 of the processor 23 in the road zone assessment device 12 selects a branching road zone that is associated with the navigation route R of the vehicle 10 that has been generated based on the navigation map and is nearest to the current location P1 of the vehicle 10 from among the multiple road zones representing a single road (the first road), in the location-estimating map, and connecting with a road zone representing another road (the second road) that is different from the single road (step S401). In the example shown in FIG. 9, the selecting unit 231 refers to the association table 100 and selects multiple road zones representing the road 30, which are associated with the navigation route R. The selecting unit 231 refers to the road zone management table 80 and selects as the branching road zone a road zone S6 representing another road 40 where the road zone represented by the connection target ID differs from the road 30, for each of the multiple road zones representing the selected road 30.

The assessment unit 232 of the processor 23 in the road zone assessment device 12 then determines whether or not the navigation route R of the vehicle 10 that has been generated based on the navigation map extends from the selected branching road zone toward the road zone of the other road (step S403).

In the example shown in FIG. 9, the assessment unit 232, referring to the navigation route R and the location-estimating map, determines that the navigation route R of the vehicle 10 extends from the branching road zone S6 representing the road 30 toward the road zone S11 representing the road 40 (step S403—Yes), and therefore the identifying unit 233 of the processor 23 refers to the navigation route R, the location-estimating map and the association table 100, and determines the end road zone to be the road zone S8 at the location nearest the destination location side of the navigation route R, from among the multiple road zones representing the road 30 that have been associated with the navigation route R (step S404).

The identifying unit 233 then identifies the road zones S7, S8 of the road 30 forward from the selected branching road zone S6 to the end road zone S8 to be release road zones (examples of other first road zones) (step S405).

Figure 12:
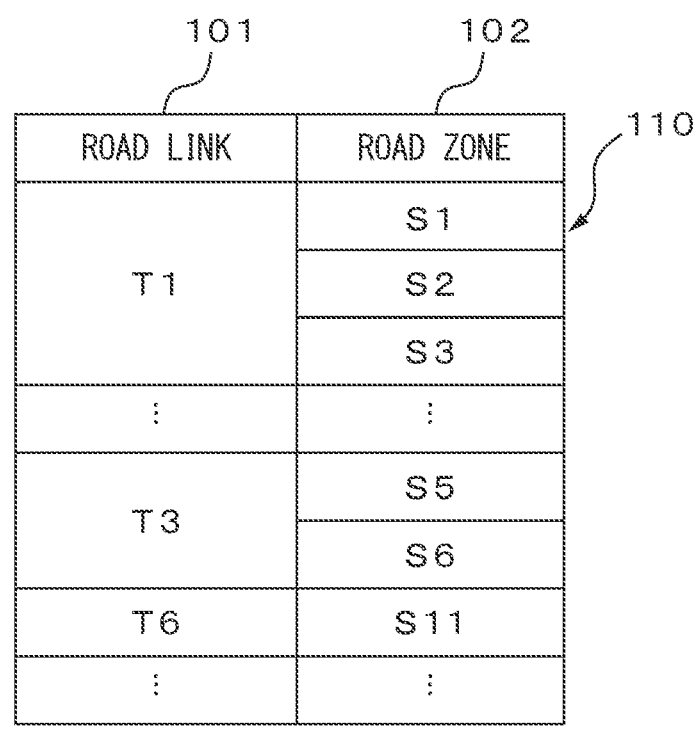
FIG. 12 is a diagram showing an association table (2).

The releasing unit 234 of the processor 23 in the road zone assessment device 12 then releases association between the release road zones S7, S8 and the navigation route R, and updates the association table 100 (step S406). FIG. 12 shows an association table 110 after association between the release road zones S7, S8 and the navigation route R has been released. In the association table 110, the road links T4, T5 that do not represent the navigation route R, and the road zones S7, S8 that were associated with the road links T4, T5, have been deleted.

When the navigation route R of the vehicle 10 does not extend from the branching road zone S6 representing the road 30 toward the road zone S11 representing the road 40 (step S403—No), on the other hand, processing proceeds to the start of step S407.

If a selected branching road zone exists in addition to the branching road zone S6, then processing between step S402 and step S407 is carried out for each and the series of the processes is completed.

As explained above, using the location-estimating map to be used for estimating the location of a vehicle, the road zone assessment device selects a first road zone that connects with a second road zone representing a second road that is different from a first road, from among multiple first road zones representing the first road, and that has been associated with a vehicle navigation route generated based on a navigation map. The road zone assessment device determines whether or not the navigation route extends from the selected first road zone to the second road zone. The road zone assessment device further identifies other first road zone associated with the navigation route, from the selected first road zone forward toward the destination location side of the navigation route. The road zone assessment device additionally releases association between the other first road zone and the navigation route, when the selected first road zone is connected with the second road zone and the navigation route extends from the selected first road zone to the second road zone. Since the road zone assessment device can thus release association with the navigation route for road zones that should not be associated with the navigation route at branching locations of the navigation route, it can prevent self-driving control from being executed toward routes that are not navigation routes.

The road zone assessment device, computer program for road zone assessment, media storing the computer program for road zone assessment and road zone assessment method according to the embodiments described in the present disclosure, may incorporate appropriate modifications that still fall within the gist of the disclosure. Moreover, the technical scope of the disclosure is not limited to these embodiments, and includes the invention and its equivalents as laid out in the Claims.

For example, in the embodiments described above, the selecting unit selected a first road zone associated with a vehicle navigation route generated based on the navigation map, which was nearest to the current location of the vehicle from among the multiple first road zones representing the first road, and connected with the second road zone representing the second road that was different from the first road, on the location-estimating map. As a result, in the example shown in FIG. 9, the road zone S6 and road zone S8 may be selected as end road zones, but the road zone S6 that is nearest the current location of the vehicle is selected before the road zone S8. Association between the road zone S8 and the navigation route is also released. When there is only one road zone selected as the end road zone for one road in the navigation route, therefore, the selecting unit may select the first road zone from among the multiple first road zones representing the first road that is associated with the vehicle navigation route generated based on the navigation map, and is connected with the second road zone representing the second road that is different from the first road on the location-estimating map.

The invention claimed is:

1. A road zone assessment device inside a vehicle, the road zone assessment device comprising:

a display; and a processor configured to, while the vehicle is navigating:

select a first road zone from among multiple first road zones, the selected first road zone being connected with a second road zone on a location-estimating map used for estimating the location of the vehicle, the multiple first road zones representing sections of a first road associated with a vehicle navigation route generated based on a navigation map and overlapping with road links extending from a branching location node, and the second road zone representing a second road different from the first road, determine whether the vehicle navigation route extends from the selected first road zone to the second road zone, identify an alternate first road zone connected to the selected first road zone in a direction of a destination location of the vehicle navigation route, the alternate first road zone being associated with the vehicle navigation route, determine that the alternate first road zone is erroneously associated with the vehicle navigation route based on the selected first road zone being connected with the second road zone and the vehicle navigation route extending from the selected first road zone to the second road zone, disassociate the alternate first road zone from the navigation route based on the determination that the alternate first road zone is erroneously associated with the vehicle navigation route, and control the display to display the vehicle navigation route with the alternative first road zone disassociated.

2. The road zone assessment device according to claim 1, wherein the processor is further configured to identify an end first road zone located furthest in the direction of the destination location of the vehicle navigation route from among the multiple first road zones, and identify alternate first road zones from the selected first road zone toward the end first road zone.

3. The road zone assessment device according to claim 1, wherein the processor is further configured to select the first road zone from among the multiple first road zones on the location-estimating map based on the selected first road zone being nearest to the current location of the vehicle and being connected with the second road zone.

4. A computer-readable, non-transitory medium storing a computer program for road zone assessment, wherein the computer program causes a processor to execute a process while the vehicle is navigating, the process comprising:

selecting a first road zone from among multiple first road zones, the selected first road zone being connected with a second road zone on a location-estimating map used for estimating the location of the vehicle, the multiple first road zones representing sections of a first road associated with a vehicle navigation route generated based on a navigation map and overlapping with road links extending from a branching location node, and the second road zone representing a second road different from the first road;

determining whether the vehicle navigation route extends from the selected first road zone to the second road zone;

identifying an alternate first road zone connected to the selected first road zone in a direction of a destination location of the vehicle navigation route, the alternate first road zone being associated with the vehicle navigation route;

determining that the alternate first road zone is erroneously associated with the vehicle navigation route based on the selected first road zone being connected with the second road zone and the vehicle navigation route extending from the selected first road zone to the second road zone;

disassociating the alternate first road zone from the navigation route based on the determination that the alternate first road zone is erroneously associated with the vehicle navigation route; and controlling an in-vehicle display to display the vehicle navigation route with the alternative first road zone disassociated.

5. A road zone assessment method carried out by a road zone assessment device inside a vehicle and while the vehicle is navigating, the method comprising:

selecting a first road zone from among multiple first road zones, the selected first road zone being connected with a second road zone on a location-estimating map used for estimating the location of the vehicle, the multiple first road zones representing sections of a first road associated with a vehicle navigation route generated based on a navigation map and overlapping with road links extending from a branching location node, and the second road zone representing a second road different from the first road;

determining whether the vehicle navigation route extends from the selected first road zone to the second road zone;

identifying an alternate first road zone connected to the selected first road zone in a direction of a destination location of the vehicle navigation route, the alternate first road zone being associated with the vehicle navigation route;

determining that the alternate first road zone is erroneously associated with the vehicle navigation route based on the selected first road zone being connected with the second road zone and the vehicle navigation route extending from the selected first road zone to the second road zone;

disassociating the alternate first road zone from the navigation route based on the determination that the alternate first road zone is erroneously associated with the vehicle navigation route; and controlling an in-vehicle display to display the vehicle navigation route with the alternative first road zone disassociated.

* * * * *